(12) United States Patent
Voda

(10) Patent No.: US 10,893,722 B2
(45) Date of Patent: Jan. 19, 2021

(54) MAGNETIC FASTENERS

(71) Applicant: Matthew Voda, New York, NY (US)

(72) Inventor: Matthew Voda, New York, NY (US)

( * ) Notice: Subject to any disclaimer, the term of this patent is extended or adjusted under 35 U.S.C. 154(b) by 0 days.

(21) Appl. No.: 16/516,145

(22) Filed: Jul. 18, 2019

(65) Prior Publication Data

US 2020/0022460 A1 Jan. 23, 2020

Related U.S. Application Data

(60) Provisional application No. 62/701,011, filed on Jul. 20, 2018.

(51) Int. Cl.
| | | |
|---|---|---|
| *A44B 1/02* | (2006.01) | |
| *A45C 13/10* | (2006.01) | |
| *F16B 1/00* | (2006.01) | |

(52) U.S. Cl.
CPC ............ *A44B 1/02* (2013.01); *A45C 13/1069* (2013.01); *F16B 1/00* (2013.01); *A44D 2203/00* (2013.01); *F16B 2001/0035* (2013.01)

(58) Field of Classification Search
CPC ...... A44B 1/02; F16B 1/00; F16B 2001/0035; A44D 2203/00; A45C 13/1069
See application file for complete search history.

(56) References Cited

U.S. PATENT DOCUMENTS

| | | | |
|---|---|---|---|
| 4,249,267 A | | 2/1981 | Voss |
| 4,455,719 A | * | 6/1984 | Morita ................. E05C 19/16 |
| | | | 24/303 |
| 5,560,089 A | * | 10/1996 | Morita ................. A41F 1/002 |
| | | | 24/303 |
| 6,215,381 B1 | * | 4/2001 | Aoki ................. A45C 13/1069 |
| | | | 24/303 |
| 6,378,174 B1 | | 4/2002 | Wong |
| 2006/0192642 A1 | | 8/2006 | Ruiz et al. |
| 2013/0305497 A1 | * | 11/2013 | Coman ................. B62D 27/06 |
| | | | 24/303 |
| 2017/0372813 A1 | | 12/2017 | Parmeter et al. |

FOREIGN PATENT DOCUMENTS

| | | |
|---|---|---|
| CN | 203913661 U | 11/2014 |
| FR | 2997307 A1 | 5/2014 |
| GB | 2538564 A | 11/2016 |
| WO | 2011128851 A2 | 10/2011 |

* cited by examiner

*Primary Examiner* — Robert Sandy

(74) *Attorney, Agent, or Firm* — Gearhart Law LLC

(57) ABSTRACT

The present disclosure relates to fasteners for a variety of items including but not limited to luggage, clothing, handbags, etc. The fasteners have magnetic properties to ensure a solid yet removable connection between the fasteners. In at least one embodiment, a magnetic member is wrapped, at least partially, in a length of material thereby shielding the magnetic member from damage as well as assisting in coupling with another magnetic member.

14 Claims, 7 Drawing Sheets

MAGNETIC FASTENERS

CLAIM OF PRIORITY

This application takes priority from provisional U.S. application Ser. No. 62/701,011 entitled "Magnetic Fasteners", filed Jul. 20, 2018, the entirety of which is hereby incorporated by reference as if fully set forth herein.

FIELD OF THE EMBODIMENTS

The field of the present invention and its embodiments relate to fasteners for a variety of items including but not limited to luggage, clothing, handbags, etc. The fasteners have magnetic properties to ensure a solid yet removable connection between the fasteners.

BACKGROUND OF THE EMBODIMENTS

The most commonly known and used types of fasteners for clothing and fabric materials are buttons, snaps, hook and loop fasteners, teeth and groove fasteners, etc. Each of these types of fasteners are comprised of elements which have features that resist uncoupling absent manual manipulation. Thus, a person can be assured that catastrophic failure of a fastener is not likely during the ordinary course of a day.

While some attention has been given to magnetic fasteners and closures, the end result produces a number of undesired effects on the item to which the magnetic fastener is attached. Generally speaking, this is likely due to the ferrous composition of magnetic materials, which rusts and stains fabrics, unless otherwise protected, when they are wet or dampened for extended period of time as would occur in laundering. Further, there are a number of issues with maintaining magnetic strength with inexpensive materials, the weight and bulk of the fastener to support the desired strength, and the relative inflexibility of the magnetic fasteners in the same manner as with buttons, snaps, etc. For example, a magnetic fastener that can be easily separated may result in a garment exposing a portion of a wearer's body which is undesirable or embarrassing to the wearer. Consequently, magnetic materials have seen tepid use in practice.

Rare earth magnets, such as neodymium magnets, do not typically present the same rusting/staining issues as ferrous based magnets. However, rare earth magnets are, by nature, very brittle and susceptible to pitting, cracking, shattering, and other undesirable structural failures as a result of repeated collisions with various external structures (including other magnets). Thus, attempts to make magnetic fasteners employing rare earth magnets are often heavy and bulky due to the need to protect the magnet by way of various prongs, eyelets, and other protective mechanisms and modes of attachment to a secondary item. The bulk and heft of these designs makes for an unsightly and impractical magnetic fastener.

There remains a need for relatively inexpensive and practical magnetic fastener, for fabrics (including clothing), which can and will close and hold together two pieces of material. Additionally, such a fastener will need to hold the material securely, while still allowing for some adjustment. The fastener must also be light weight for use in and with clothing garments and other worn or carried materials. The present invention and its embodiments meets and exceeds these objectives.

REVIEW OF RELATED TECHNOLOGY

U.S. Pat. No. 4,249,267 pertains to a fastener means for fabrics and clothing and which includes a magnetic tape material which is sewn into or otherwise applied to next adjacent edges of cloth material intended to be overlapped. Such magnetic material being relatively thin and light weight, pliable and flexible, capable of being cut to desired lengths and having the general characteristics of a narrow strip of fabric or cloth material itself.

U.S. Patent Application 2006/0192642 pertains to a material, device, or matter with the use of magnets that are connected to the said material, device, or matter that have an alternate polarity or charge down each side of the said material, device, or matter. With this method, the securing of material, device, or matter is made easier, quicker, and more effective than other method of securing material, device, or matter when using magnets.

U.K. Patent Application 2538564 pertains to an item of upper-body clothing that comprises a main housing with a front and a back, an upper neck opening and a lower opening. The shirt has a frontal opening extending down the front of the main housing from the neck opening to the lower opening. The frontal opening is releasably closable by means of a plurality of pairs of neodymium magnets attached to the clothing in substantially fixed positions, and spaced apart alongside the frontal opening. Buttons are provided in front of each pair of magnets giving the shirt the appearance of a standard buttoned opening. Shirt cuffs comprising a magnetic closure and for display a button or cufflink ends are also disclosed.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF EMBODIMENTS

Generally, the present invention and its embodiments provide for a magnetic fastener system that can used for a variety of purposes on a variety of differing articles. In at least one embodiment, a magnetic member is wrapped, at least partially, in a length of material, namely a length of metal, to provide protection to the magnetic member. Further, the length of material provides "grooves" between loops of the length of material for the joining of two fasteners that assist in preventing undesired uncoupling of the fasteners.

In one embodiment of the present invention there is a magnetic fastener having a magnetic member with an aperture; and a length of material wrapped around a portion of the magnetic member.

In another embodiment of the present invention there is a magnetic fastener having a circular magnetic member defining an outer surface, the circular magnetic member having a circular aperture defining an inner surface; and at least one length of metal wrapped around a portion of the circular magnetic member, wherein the at least one length of metal is wrapped around the inner surface and the outer surface, and wherein there is a distance between the at least one length of metal and the circular magnetic member when the at least one length of metal is wrapped around the circular magnetic member.

In yet another aspect of the present invention there is a fastening system having a first fastener comprising: a first magnetic member having a first aperture, and a first length of material wrapped around a portion of the first magnetic member; and a second fastener comprising: a second magnetic member having a second aperture, and a second length of material wrapped around a portion of the second magnetic member; wherein the first magnetic member is oriented to align with an opposing polarity of the second magnetic member; wherein the first magnetic member and the second magnetic member are oriented such that when coupled the second length of material abuts the first magnetic member and the first length of material abuts the second magnetic member. In yet further embodiments, the first and/or second length of material may not abut the magnetic member directly but may engage, to some degree, the opposing length of material.

In general, the present invention succeeds in conferring the following, and other, not mentioned, benefits and objectives.

It is an object of the present invention to provide a magnetic fastener that is lightweight and easy to use for an end user.

It is an object of the present invention to provide a magnetic fastener that provides multiple points of attachment to a desired secondary object such as a garment, handbag, etc.

It is an object of the present invention to provide a magnetic fastener that does not require an additional attachment structure on the secondary item or in addition to the magnetic fastener itself.

It is an object of the present invention to provide a magnetic fastener that is strong to ensure closure yet able to be readily uncoupled as needed.

It is an object of the present invention to provide a magnetic fastener that is resistant to chipping and other damage from repeated coupling and uncoupling of the fasteners.

It is an object of the present invention to provide a magnetic fastener that can be concealed or readily visible.

It is an object of the present invention to provide a magnetic fastener that has a structure configured to prevent undesired uncoupling of the fasteners.

It is an object of the present invention to provide a magnetic fastener that utilizes rare earth magnets.

It is an object of the present invention to provide a magnetic fastener that has an expanded magnetic field.

BRIEF DESCRIPTION OF THE DRAWINGS

FIG. 5 is front view of an accessory incorporating an embodiment of the present invention.

FIG. 6 is a front view of a second accessory incorporating an embodiment of the present invention.

DESCRIPTION OF THE PREFERRED EMBODIMENTS

Figure 1A:
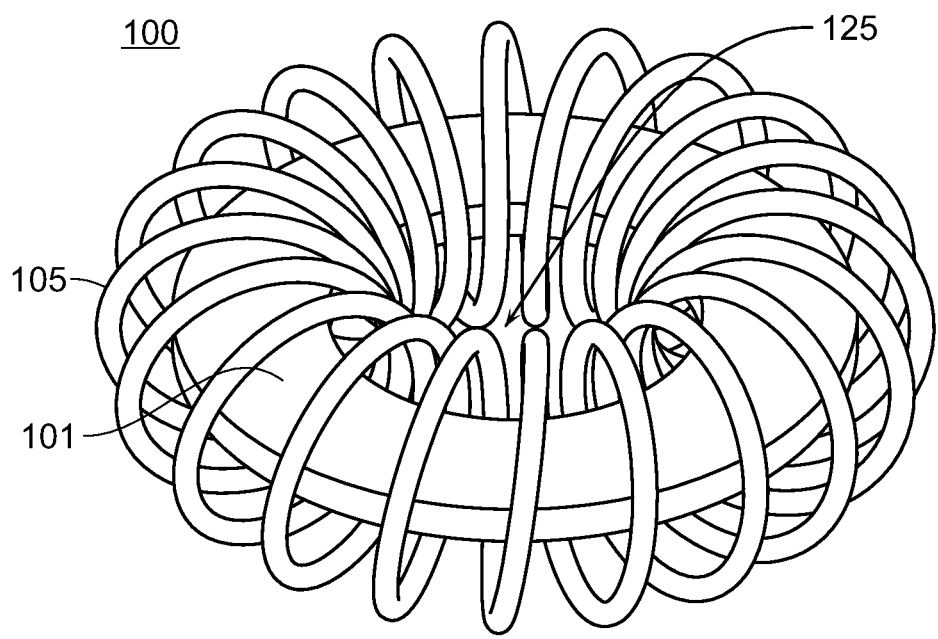
FIG. 1A is a perspective view of a first embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIGS. 1A-3B, there are exemplary embodiments of a magnetic fastener 100 of the present invention. Generally, the magnetic fastener 100 comprises a magnetic member 101 and a length of material 105 enveloping or wrapping around some portion of the magnetic member 101.

The magnetic member 101 may take a number of shapes and sizes and further features a range of magnetic forces based on the composition of the magnetic member 101. In at least one embodiment, the magnetic member 101 has an aperture 125 therethrough. This aperture 125, as described below, allows for the length of material 105 to be wrapped around a portion of the magnetic member 101.

In a preferred embodiment, the magnetic member 101 comprises a rare-earth magnet. Such rare earth magnets may be a neodymium magnet or other conventionally known rare-earth magnets. However, alternative embodiments are not restricted to such rare earth elements and may comprise various composites including, but not limited to, aluminum, nickel, cobalt, iron, copper, titanium, iron oxide, barium, strontium carbonate, etc. Rare-earth magnets, such as neodymium magnets and samarium cobalt magnets, are extremely brittle and also vulnerable to corrosion. Thus, the utilization of such magnets needs special care and consideration to prevent damage to the magnetic fastener 100 and to prevent damage to the item to which the magnetic fastener 100 is attached.

The length of material 105 helps to provide some of the aforementioned protection which is needed to prevent damage to the magnetic member 101. The length of material 105 may be wrapped around the magnetic member 101 through the aperture 125 as shown in the drawings. The length of material 105 may be disposed along an entirety of the magnetic member 101 (see FIGS. 1A-1B) or may be wrapped around a portion thereof (see FIGS. 2A-2B). The length of material 105 may be embodied as a length of metal wire, a compression spring, or other suitable length of material capable of being wrapped around the magnetic member 101 as described herein.

Figure 1B:
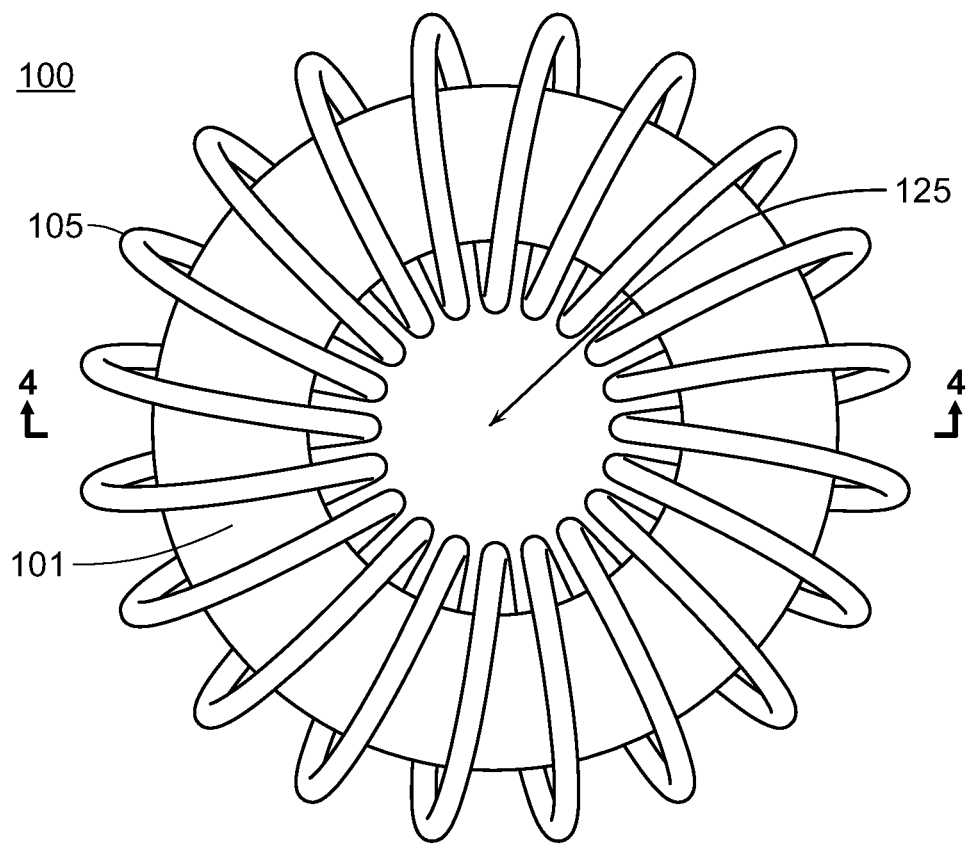
FIG. 1B is a top view of a first embodiment of the present invention.
Figure 2A:
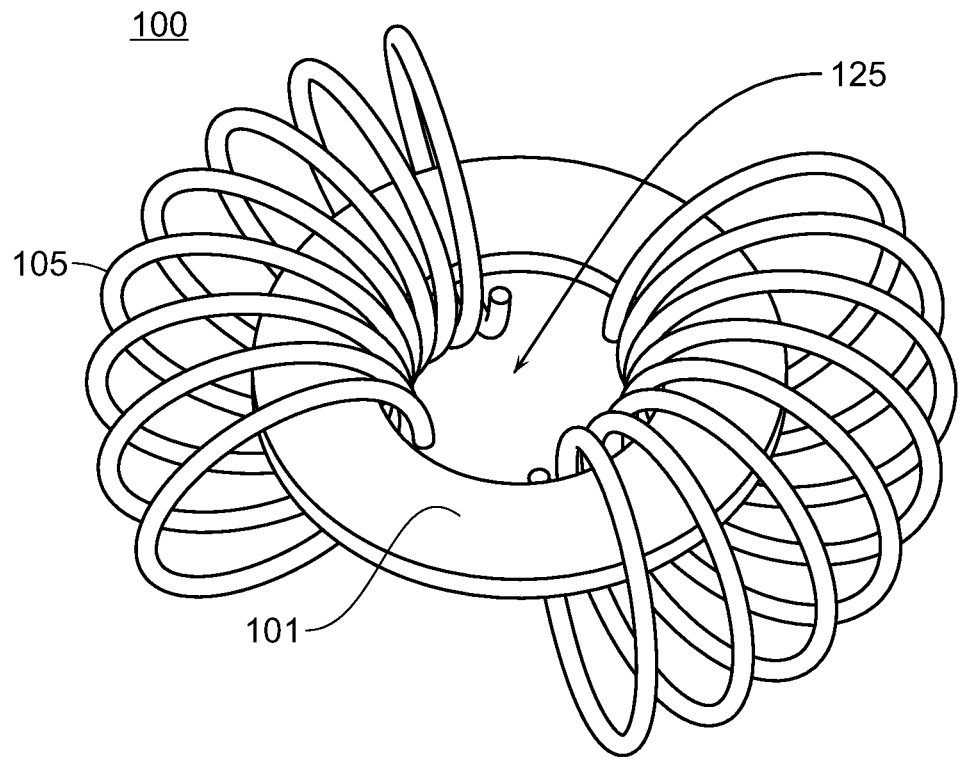
FIG. 2A is a perspective view of a second embodiment of the present invention.
Figure 2B:
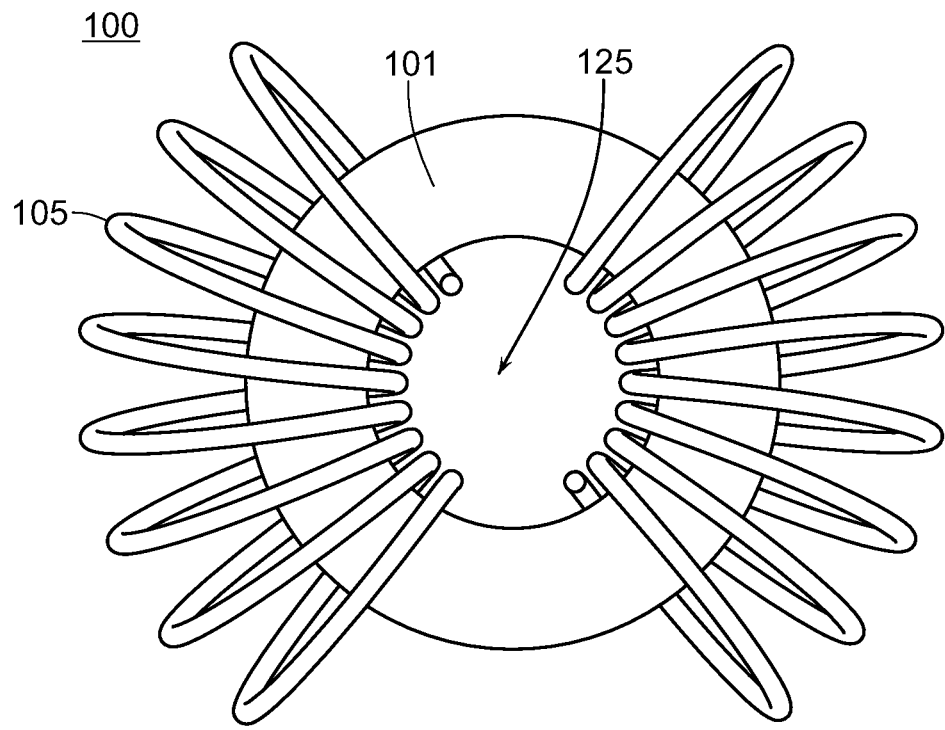
FIG. 2B is a top view of a second embodiment of the present invention.
Figure 3A:
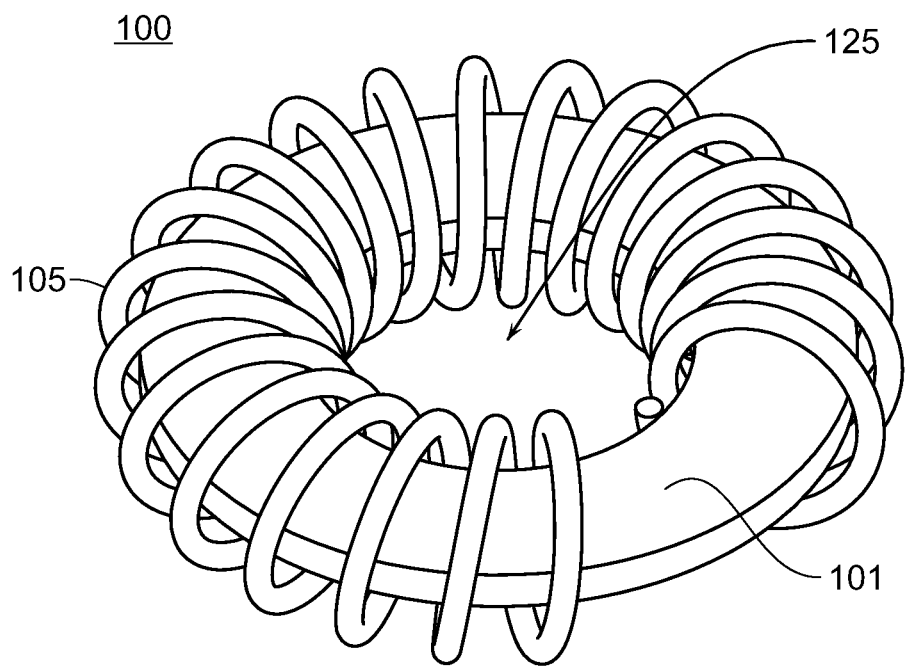
FIG. 3A is a perspective view of a third embodiment of the present invention.
Figure 3B:
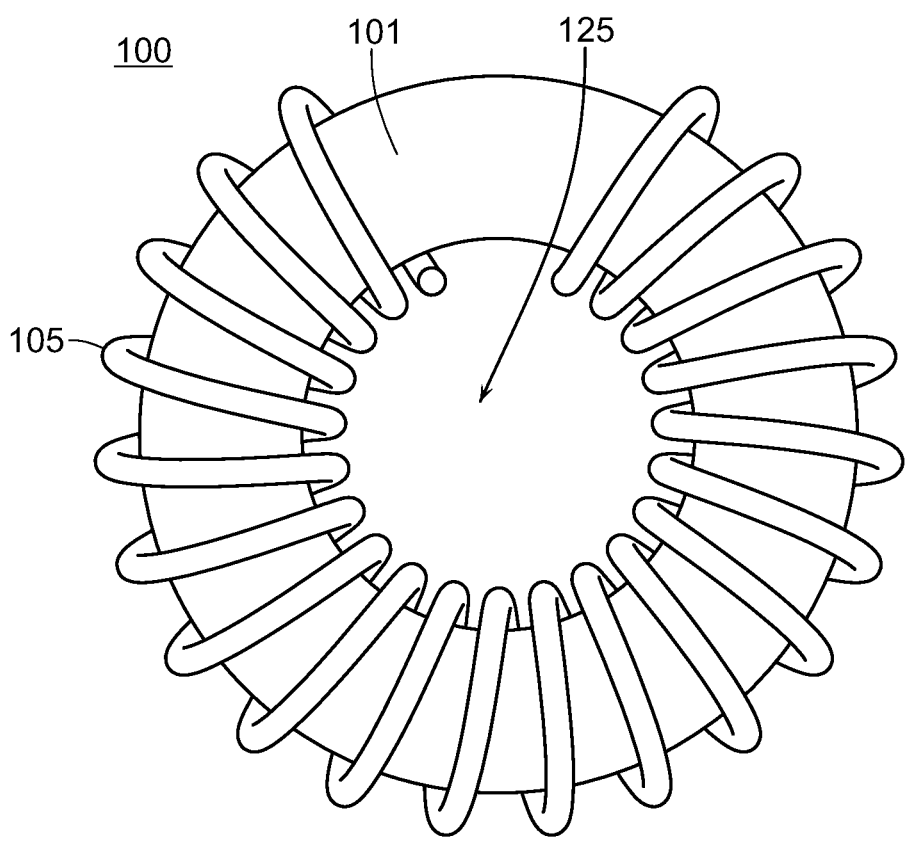
FIG. 3B is a top view of a third embodiment of the present invention.

The length of material 105 may take a number of varying configurations in addition to the amount the magnetic member 101 covered by the length of material 105. For example, as shown in FIGS. 3A-3B, the length of material 105 may be tightly wrapped around the magnetic member 101 such that there is little space between the length of material 105 and a surface (top, bottom, side) of the magnetic member 101. In other embodiments, as shown in FIGS. 1A-1B the length of material 105 is wrapped such that there is a larger given distance between the length of material 105 and a surface of the magnetic member 101. In some embodiments, the length of magnetic material 105 is more closely drawn or tightly wrapped with a bias towards a particular surface of the magnetic member 101. For example, as shown in FIGS. 2A-2B, the length of material 105 is wrapped such that the length of material 105 is positioned tightly against an inner surface of the aperture 125 whereas the length of material is much more loosely positioned in relation to an outer surface of the magnetic member 101. These configurations may be utilized in a fastening system where the magnetic fasteners 100 used in the system are the same or different as another magnetic fastener 100 in the system.

The length of material 105 may comprise a number of metallic and in some embodiments non-metallic material(s). Preferably, the length of material 105 comprises at least one of: aluminum, copper, silver, gold, lead, nickel, magnesium, manganese, scandium, bismuth, chromium, iron, cobalt, tungsten, carbon, zinc, beryllium, tin, phosphorous, rhodium, silicon, molybdenum, antimony, titanium, and the like or some combination thereof. For example, alloys such as alnico, nichrome, pewter, steel, and the like may also be utilized.

The aperture 125 in the magnetic fastener 100 may vary in size and shape. Preferably, the aperture 125 forms has a uniform distance from an outer surface of the magnetic member 101 to the aperture 125 however the aperture 125 may also be irregularly shaped. Additionally, it is preferable that there is a singular aperture 125 in the magnetic member 101. However, there may be embodiments featuring multiple apertures 125 and the length of material 105 may be positioned or wrapped through a single aperture or some amount of additional apertures depending on the desired configuration of the magnetic fastener.

As shown in FIGS. 2A-2B, there may be more than one length of material 105 present on the magnetic member 101. The use of multiple, distinct lengths of material 105 allow for a number of additional structural features to interact with the magnetic fastener 100. For example, between the lengths of material 105 there may be a gap(s) for other material to be passed around the magnetic member 101 (e.g. magnetic fastener hanging from the end of a leather loop). Further, a gap in the length of material 105 will cause the magnetic fastener 100 to lay at an angle relative to the complementary magnetic fastener 101. Since the two magnetic fasteners would not be parallel to one another but at some other angle, this would likely allow easier release or release in a particular direction of movement of the magnetic fasteners 100. Additionally, the implementation of multiple lengths of material 105 provides for desired aesthetics for a particular accessory or worn item to which the magnetic fasteners 100 are coupled.

Figure 4:
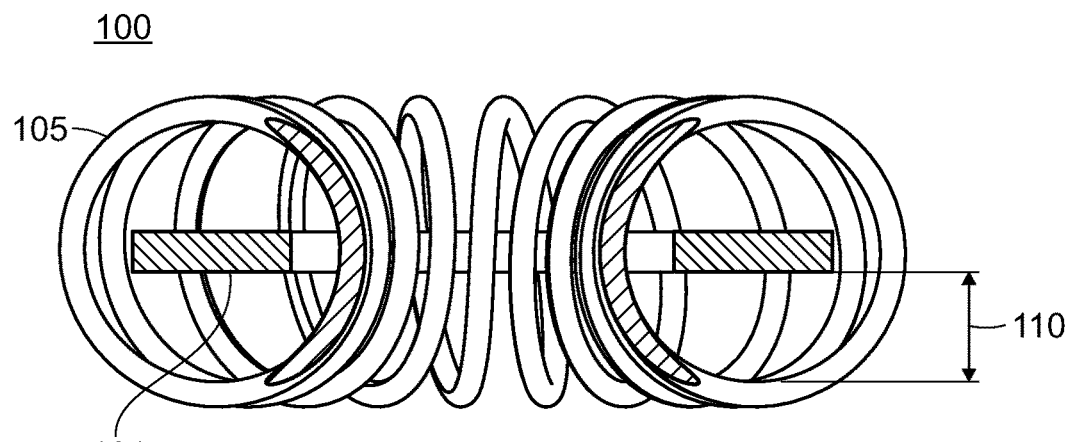
FIG. 4 is a sectional side view of an embodiment of the present invention.
Figure 5:
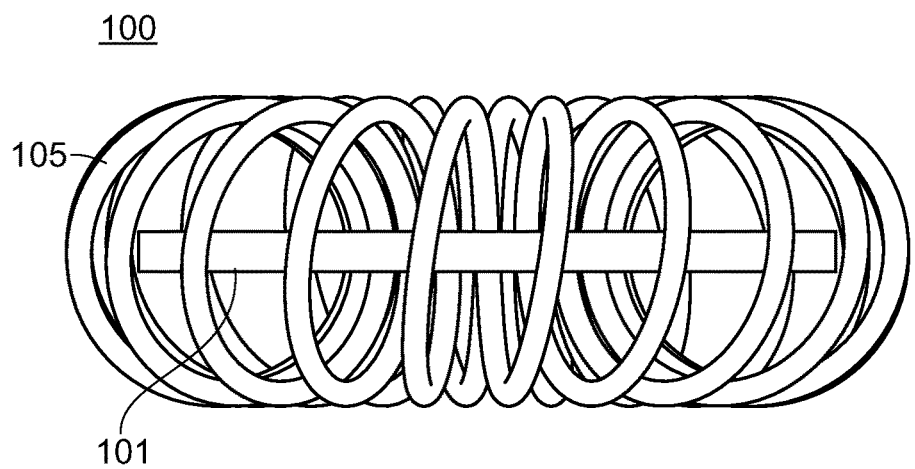
FIG. 5 is a side view of an embodiment of the present invention.

Referring now to FIGS. 4-5, there is a sectional side view and a side view of an embodiment of the present invention. As shown, the magnetic fastener 100 comprises a magnetic member 101 and a length of material 105. Shown is a distance 110 between the magnetic member 101 and the length of material 105. As described above, the distance 110 may vary based on a position of the length of material 105 and a desired configuration for the magnetic fastener 100. In a preferred embodiment, the length of material 105 is resilient such that the length of material 105 is resistant to deformation during use and coupling/uncoupling of the fasteners. While some amount of deformation is to be expected during the ordinary course of use, a high degree of deformation of the length of material 105 would fail to provide the requisite protection from the magnetic members 101 and thereby allow the magnetic members 101 to contact one another. As stated herein, allowing for such contact is undesirable and would allow for potential structural damage and/or failure of the magnetic fastener(s) 100.

Figure 6:
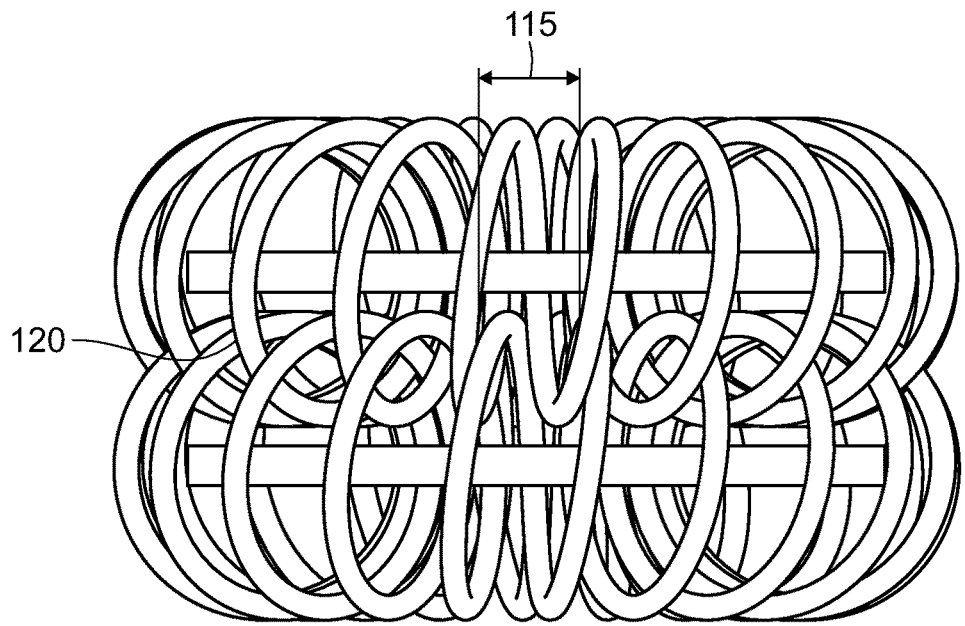
FIG. 6 is a side view of an embodiment of the present invention in a stack or paired configuration.

FIG. 6 demonstrates a fastening system, that is, the utilization of two or more magnetic fasteners 100 in conjunction with one another. As shown, it is preferable that the magnetic fasteners 100 be arranged such that the opposing polarity is oriented to allow the magnetic members 101 to magnetically attract one another. When coming together, the magnetic fasteners 100 may further be oriented such that the length of material 105 of one of the fasteners impacts the magnetic member 101 of the opposing fastener and vice versa. The gaps 115 formed by the length of material 105 may be varied in dimensions but is at least of a size to receive the diameter of the length of material 105 of an opposing magnetic fastener 100 therethrough. The trough or apex 120 of the loops of the length of material 105 are configured to impact the magnetic member 101 upon magnetic attraction with another magnetic fastener 100.

Further, in some embodiments, the trough or apex 120 of the loops of the length of material 105 coupled to one magnetic member 101 do not directly abut or impact the opposing magnetic member 101 of the fastening pair. For example, the embodiment shown in FIGS. 2A-2B could be paired with the embodiment shown in FIGS. 3A-3B (with one fastener from each embodiment forming the fastening pair). In such an example, the length of material 105 of the embodiment shown in FIG. 2A would contact the magnetic member 101 of the opposing fastener, whereas the length of material 105 shown in FIG. 3A would essentially be prevented from contacting the magnetic member 101 due to the diameter of the loops formed by the length of material 105 of the magnetic fastener 100 shown in FIG. 2A.

Without being bound by theory, it is believed that, by optimization, the diameter of the length of material 105, the distance 110 separating the length of material 105 and the magnetic member 101, and the type of magnetic member 101 chosen that one may be able to expand the magnetic field of the magnetic fasteners 100. This increases the working functionality of the magnetic fasteners 100 to attract another fastener and resists separation from that fastener.

Figure 7:
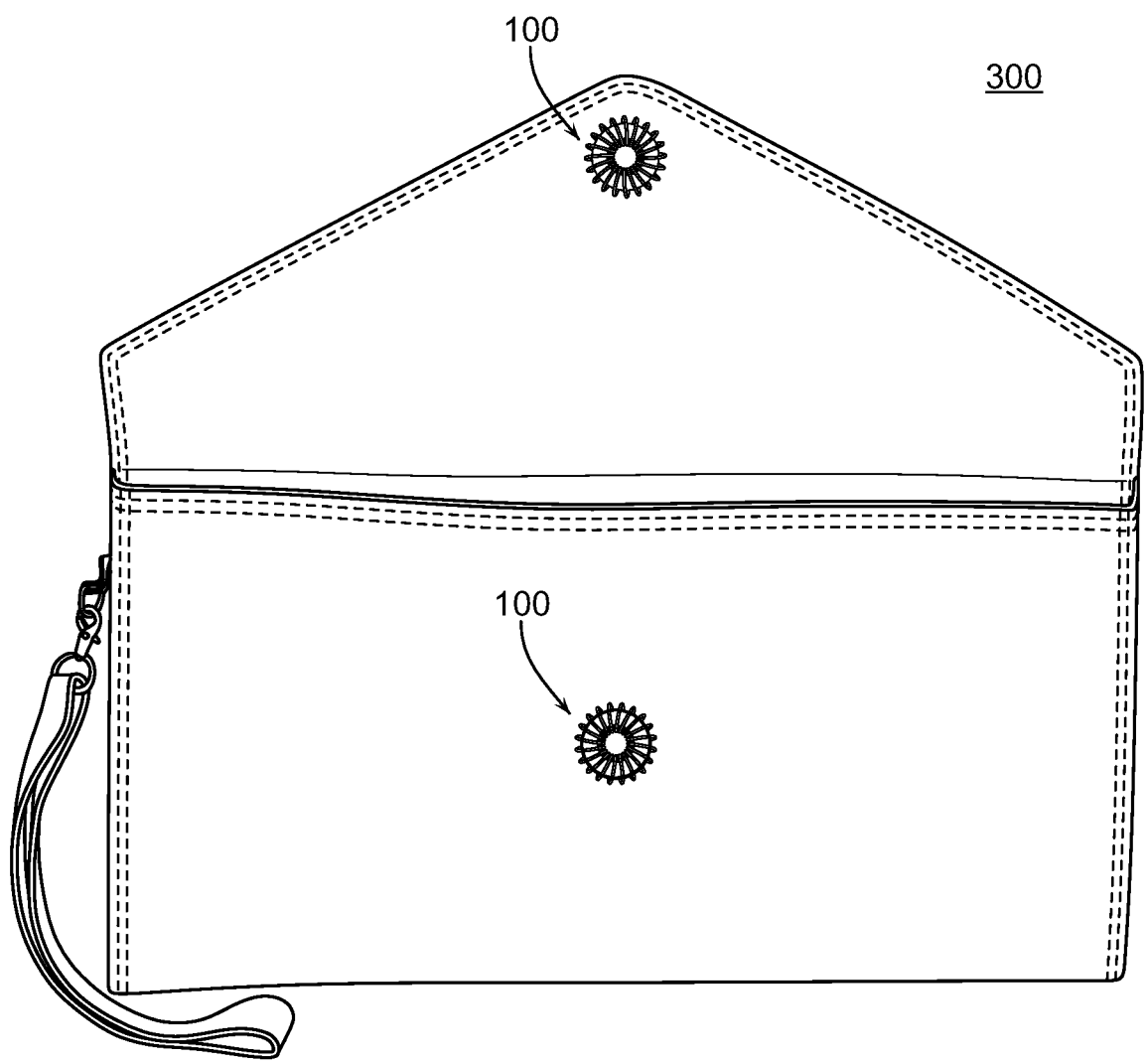
FIG. 7 is a front view of a clutch handbag showing an embodiment of the present invention used to secure a portion of the clutch handbag.
Figure 8:
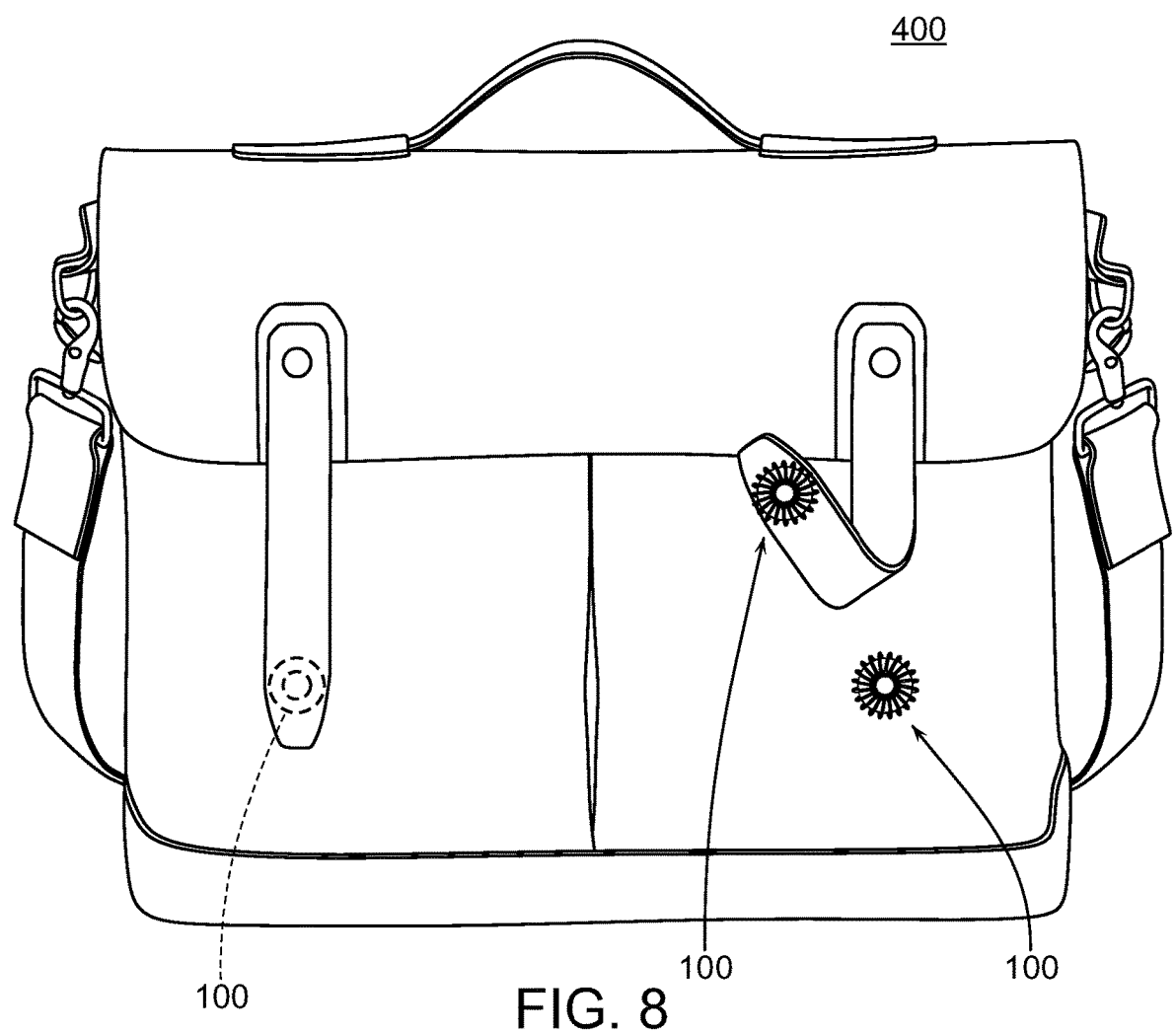
FIG. 8 is a front view of a messenger bag utilizing an embodiment of the present invention to secure a portion of the messenger bag.

Referring now to FIGS. 7 and 8, shown is a clutch handbag 300 (see FIG. 7) and a messenger bag 400 (see FIG. 8). Here, the magnetic fasteners 100 may be embedded in the material of the respective accessory or may be exposed as a functional, yet decorative element. Typically, in such an embodiment, the magnetic fasteners 100 will be used to selectively hold closed one or more openings of the accessory.

Figure 9:
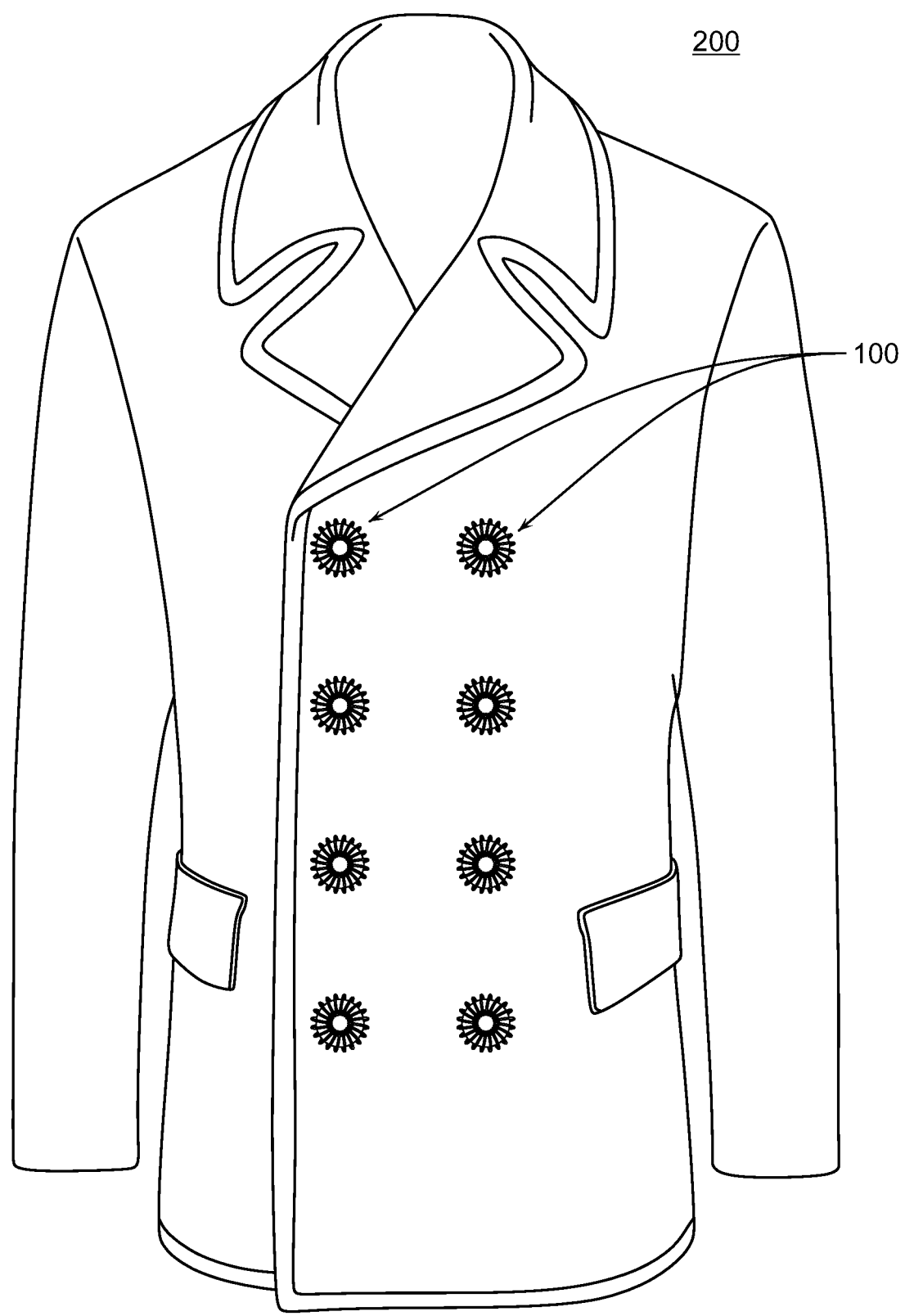
FIG. 9 is a front view of an article of clothing showing an embodiment of the present invention used to secure a portion of the article of clothing.

As shown in FIG. 9, one or more of the fasteners 100 are coupled to an article of clothing 200. The article of clothing 200 may be virtually any type of clothing including but not limited to t-shirts, sweatshirts, scarves, dresses, skirts, shorts, overcoats, jackets, vests, sweaters, blazers, pants, and the like. The magnetic fasteners 100 are preferably coupled to an exterior surface of the article of clothing 200. Further, the magnetic fasteners 100 are positioned on the upper and lower surfaces of the respective portion of fabric to allow the magnetic fasteners 100 to be sufficiently coupled. The magnetic fasteners 100 may be coupled to the article of clothing 200 via threading, adhesives, or other suitable means.

In another embodiment of the present invention, the magnetic fasteners 100 may be sewn into the fabric of the article of clothing 200. Thus, one magnetic fastener 100 resides between a first upper layer and a first lower layer of the article of clothing 200 and a second magnetic fastener 100 resides between a second upper layer and a second lower layer of the article of clothing 200.

However, the uses should not be limited to articles of clothing and other examples shown herein, and the magnetic fasteners 100 may be used in any implementation that requires such fasteners including but not limited to articles of footwear, back packs, briefcases, handbags, purses, watches, jewelry, appliances, and the like or some combination thereof.

Further, the magnetic fasteners 100 described herein are shown in pairs general comprising the same general construction of a length of material positioned around a portion of a magnetic material. However, in some embodiments, only one of the two pairing fasteners may take the form as described herein. In other instances, the one of the two pairing fasteners may simply be a magnet of any size, shape, composition, etc. In yet other instances, a magnetically receptive material (such as a ferro-magnet) may comprise one of the two fasteners.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A magnetic fastener comprising:
   a magnetic member having an aperture; and
   a length of material wrapped around at least a portion of the magnetic member,
      wherein the length of material is wrapped around the magnetic member and passes through the aperture, and
      wherein there is a distance between the length of material and at least one surface of the magnetic member when the length of material is wrapped around the magnetic member.

2. The fastener of claim 1 wherein the magnetic member is circular in shape.

3. The fastener of claim 1 wherein the length of material is at least one wire.

4. The fastener of claim 1 wherein the length of material is at least one spring.

5. The fastener of claim 3 wherein the at least one wire, when wrapped around the magnetic member, forms at least one loop, wherein the at least one loop has a diameter greater than a diameter of the magnetic member.

6. The fastener of claim 4 wherein the at least one spring, when wrapped around the magnetic member, forms at least one loop, wherein the at least one loop has a diameter greater than a diameter of the magnetic member.

7. The fastener of claim 1 wherein the magnetic member is a rare earth magnet.

8. The fastener of claim 7 wherein the rare earth magnet is a neodymium magnet.

9. A magnetic fastener comprising:
   a circular magnetic member defining an outer surface, the circular magnetic member having a circular aperture defining an inner surface; and
   at least one length of metal wrapped around a portion of the circular magnetic member,
   wherein the at least one length of metal is wrapped around the inner surface and the outer surface, and
   wherein there is a distance between the at least one length of metal and the circular magnetic member when the at least one length of metal is wrapped around the circular magnetic member.

10. The fastener of claim 9 wherein the circular aperture is centrally positioned in the circular magnetic member.

11. The fastener of claim 9 wherein the at least one length of metal is wrapped around an entire periphery of the circular magnetic member.

12. The fastener of claim 9 wherein the at least one length of metal comprises two distinct lengths of metals.

13. The fastener of claim 12 wherein the two distinct lengths of metal do not overlap.

14. A fastening system comprising:
   a first fastener comprising:
      a first magnetic member having a first aperture, and
      a first length of material wrapped around a portion of the first magnetic member; and
   a second fastener comprising:
      a second magnetic member having a second aperture, and
      a second length of material wrapped around a portion of the second magnetic member;
   wherein the first magnetic member is oriented to align with an opposing polarity of the second magnetic member;
   wherein the first magnetic member and the second magnetic member are oriented such that when coupled the second length of material abuts the first magnetic member and the first length of material abuts the second magnetic member.

* * * * *